United States Patent [19]

McCampbell

[11] Patent Number: 4,773,617

[45] Date of Patent: Sep. 27, 1988

[54] LIGHTER-THAN-AIR CRAFT

[76] Inventor: Burton L. McCampbell, 1346 S. Wolfe Rd., Sunnyvale, Calif. 94087

[21] Appl. No.: 22,069

[22] Filed: Mar. 5, 1987

[51] Int. Cl.$^4$ .................................................. B64B 1/60
[52] U.S. Cl. ........................................ 244/24; 244/30; 244/31; 244/128; 244/97
[58] Field of Search .................. 244/128, 97, 98, 99, 244/24, 29, 30, 31

[56] References Cited

U.S. PATENT DOCUMENTS

| | | | |
|---|---|---|---|
| 1,160,095 | 11/1915 | Boerner | 244/97 |
| 1,336,601 | 4/1920 | Upsor | 244/30 |
| 1,549,570 | 9/1925 | Boothby | 244/97 |
| 1,577,756 | 3/1926 | Reagan | 244/97 |
| 1,648,935 | 11/1927 | Campau | 244/97 |
| 1,682,405 | 8/1928 | Naatz | 244/30 |
| 1,853,376 | 4/1932 | Powelson et al. | 244/97 |
| 1,900,744 | 3/1933 | Strobl | 244/128 |
| 2,396,494 | 3/1946 | Donnell et al. | 244/30 |
| 3,488,019 | 1/1970 | Sonstegaard | 244/128 |
| 4,326,681 | 4/1982 | Estoo | 244/128 |

Primary Examiner—Galen Barefoot
Assistant Examiner—Lynn M. Fiorito
Attorney, Agent, or Firm—Gerald L. Moore

[57] ABSTRACT

A lighter-than-air craft [10] having an outer envelope [11] divided into an inner envelope [25] and a plurality of compartments [40,41,42]. The compartments are filled with lifting gases such as helium and hydrogen and the overall lifting force of the craft is regulated by supplying hot air to the inner envelope.

2 Claims, 1 Drawing Sheet

LIGHTER-THAN-AIR CRAFT

BACKGROUND OF THE INVENTION

1. Field of the Invention

An air ship design utilizing multiple envelopes to allow different lifting gases to be used.

2. Description of the Prior Art

Helium and hydrogen have been used extensively in air ships to provide the lifting force. The disadvantage of helium is the tendency to diffuse through most envelope materials thereby requiring frequent recharging which can be quite expensive. Hydrogen can be used but if allowed to mix with oxygen in the correct percentages, can result in spontaneous combustion. Both of these gases present the advantages of providing great lifting capabilities do require considerable control for take offs, landings, and hovering.

Hot air craft are relatively simple to maneuver vertically but present the difficulties of requiring a relatively large amount of fuel to operate. The air within such airships must be heated repeatedly to provide the necessary lift for flight. Additionally, the necessity to heat the lifting gas imparts certain restrictions on the configuration of the air ship.

It is the purpose of the present invention to provide an air ship utilizing a multitude of envelopes and lifting gases so as to take advantage of the benefits to be derived from each type of gas.

SUMMARY OF THE INVENTION

An air ship comprising a gas-tight outer envelope with a gas-tight inner envelope positioned therein. A rigid structure supporting the envelopes with the outer envelope being filled with a lighter-than-air gas and the inner envelope being filled with air, and means to control the temperature of the inner envelope so as to control the lift of the air ship.

DESCRIPTION OF A PREFERRED EMBODIMENT

Figure 1:
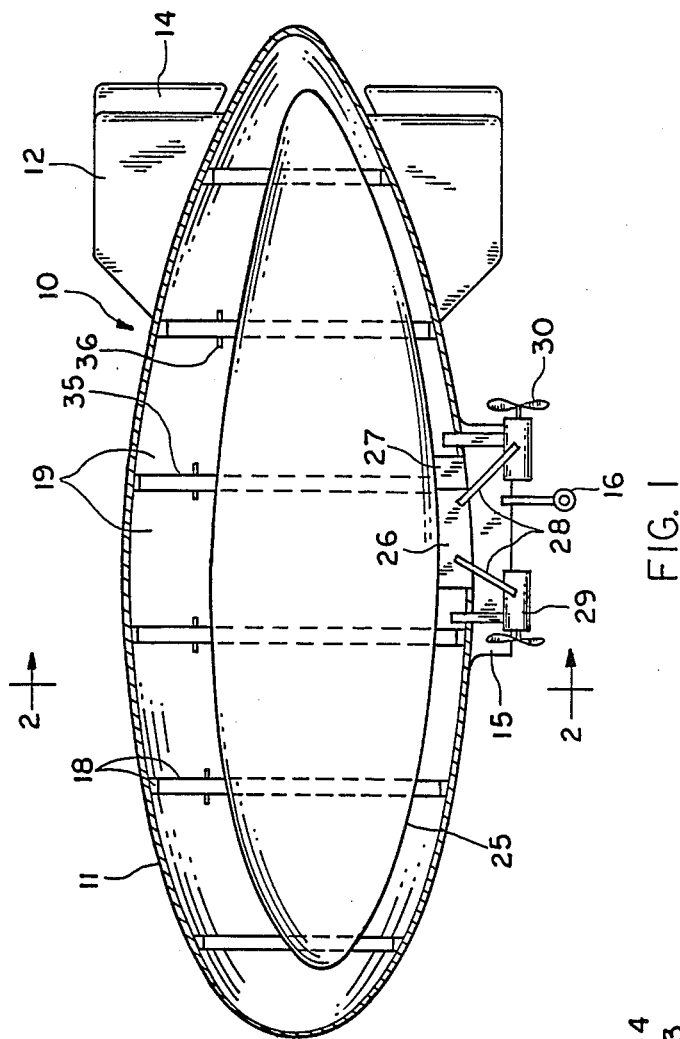
FIG. 1 is a side view, partially in cross-section, of an air ship employing the present invention.
Figure 2:
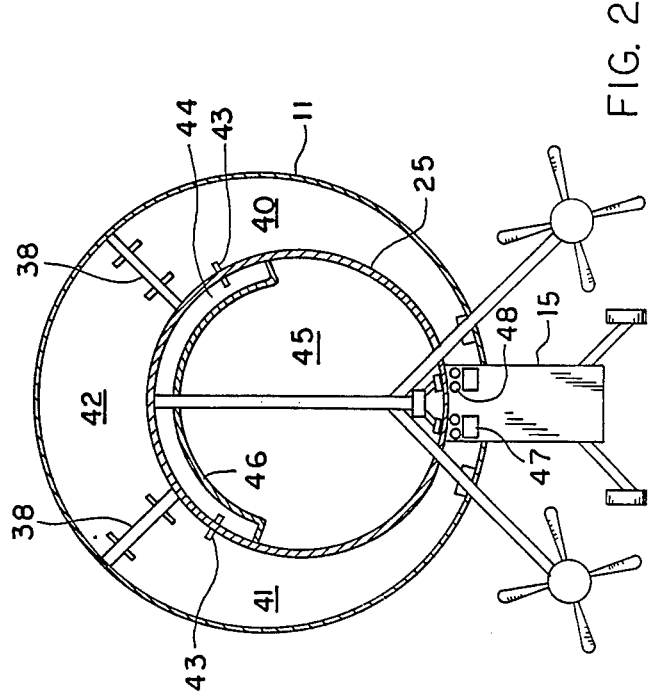
FIG. 2 is a cross-sectional view along the line 2—2 of FIG. 1.

In FIG. 1 is shown an air ship 10 comprising an outer envelope 11 of a normal configuration with fins 12 attached to the tail end and supporting control rudders 14. Attached to the bottom side is a car 15 which in the normal manner houses the crew's quarters, the control cabin, and the fuel tanks. Wheels 16 assist in supporting and maneuvering the aircraft on the ground.

The outer envelope is supported by a frame made up of rib structures 18 extending therearound and generally concentric about a longitudinal axis of the airship. These rib structures are interconnected by spars (not shown) to provide a rigid body within which is positioned a plurality of separate envelopes 19 filled with a lighter-than-air gas. Within the rigid structure is located a second or inner gas-tight envelope 25 supported at various points along the rigid structure but permitted to expand and contract with pressure changes within the second envelope. The inner envelope 25 is positioned with the longitudinal axis thereof below the longitudinal axis of the outer envelope such that the weight of the inner envelope provides stability to the aircraft by maintaining the center of gravity below the longitudinal axis of the outer envelope.

For inflating the inner envelope, a power plant 26 is provided having a heat exchanger 27 which takes in air from the outside and heats the air prior to injecting it into the second envelope. This power plant is connected through drive shafts 28 to four outboard power tranmissions 29 each connecting with drive propellers 30. These propeller mechanisms can be driven for rotation about a horizontal axis so as to propel the airship forward or backward or can be pivoted 90 degrees for rotation around a vertical axis to provide upward and downward forces to maneuver the airship vertically.

The outer envelope 11 encloses a pocket or space surrounding the inner envelope 25 and this space is divided into compartments by the bulkheads 35 such that the lifting gas can be segregated into separate chambers. Extending through these bulkheads are pressure valves 36 which allow for the passage of gas due to over-pressure conditions, etc. Additionally, this more or less annular chamber is divided longitudinally by bulkheads 38 forming compartments 40, 41, and 42. In the preferred embodiment, helium is injected into the lower compartments 40 and 41 adjacent the lower quadrants of the inner envelope and preferable hydrogen is injected into the upper compartment 42. Additionally, a collapsible envelope 44 surrounding the upper quadrants of the inner envelope is vented to the helium compartment through the vents 43 so as to contain helium. Air which can be heated is contained in the inner envelope 25. This helium serves as a barrier to prevent the mixing of oxygen from the inner compartment 45 of the inner envelope into the hydrogen compartment 42 which as explained before, could result in spontaneous combustion. Additionally, this permits the helium to expand as the hot air within the compartment 45 is permitted to cool and therefore contract. The air in the inner envelope is heated by the power plant 26.

Thus, for maneuverability, the lifting gases helium and hydrogen in the airship 10 provide the primary lifting force but the change in lifting force which is necessary for vertical movement is effected by heating the air within the inner envelope 45. If the air within the compartment 45 is allowed to cool and therefore contract, the shroud 46 expands downward due to the pressure of the helium in the compartment 44 to maintain a pressure equilibrium within the airship.

Obviously, such a ship can be provided with water-recovery apparatus (not shown) for recovery of the water from the power plant exhaust to increase the equilibrium and stability of the craft. Fuel tanks 47 and fuel lines and air ducts 48 are also provided for the operation and control of the airship.

The invention claimed is:

1. A lighter-than-air craft comprising:
   an outer gas-tight envelope having a first longitudinal axis;
   a smaller inner envelope having a second longitudinal axis below said first longitudinal axis and being positioned within said outer envlope to form a gas-tight pocket therebetween;
   a rigid structure supporting the inner and outer envelopes;
   gas tight bulkheads extending generally parallel to the first longitudinal axis and positioned in said gas tight pocket to divide said pocket into a plurality of separate longitudinal compartments;

means to fill some of said separate longitudinal compartments with helium, and the remainder with hydrogen, and means to fill the inner envelope with air;

means to heat the air in said inner envelope to vary the lift of the air craft; and a shroud forming a separate compartment between said inner envlope and some of said longitudinal compartments.

2. A lighter-than-air craft as defined in claim 1 including means to allow helium to flow into said shroud from at least one of said longitudinal compartments.

* * * * *